(12) United States Patent
McRae et al.

(10) Patent No.: US 7,992,205 B2
(45) Date of Patent: Aug. 2, 2011

(54) METHOD AND SYSTEM DEVICE FOR DETERRING SPAM OVER INTERNET PROTOCOL TELEPHONY AND SPAM INSTANT MESSAGING

(75) Inventors: Matthew Blake McRae, Laguna Beach, CA (US); Kendra Sue Harrington, Irvine, CA (US); Allen Joseph Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 952 days.

(21) Appl. No.: 11/202,660

(22) Filed: Aug. 12, 2005

(65) Prior Publication Data

US 2007/0039040 A1 Feb. 15, 2007

(51) Int. Cl.
*G06F 11/00* (2006.01)
(52) U.S. Cl. .......... 726/22; 726/23; 726/24; 726/4
(58) Field of Classification Search .......... 726/4, 22–25; 713/187–188; 709/200–201, 206
See application file for complete search history.

(56) References Cited

U.S. PATENT DOCUMENTS

| | | | |
|---|---|---|---|
| 2002/0085700 A1* | 7/2002 | Metcalf | 379/210.01 |
| 2003/0074397 A1* | 4/2003 | Morin et al. | 709/203 |
| 2004/0064515 A1 | 4/2004 | Hockey | |
| 2004/0203363 A1* | 10/2004 | Carlton et al. | 455/41.2 |
| 2005/0141486 A1 | 6/2005 | Gilchrist et al. | |
| 2006/0007915 A1* | 1/2006 | Frame | 370/352 |
| 2006/0047769 A1* | 3/2006 | Davis et al. | 709/207 |
| 2006/0168033 A1 | 7/2006 | Cai | |
| 2006/0182029 A1 | 8/2006 | Kealy | |
| 2006/0187900 A1* | 8/2006 | Akbar | 370/352 |
| 2006/0277259 A1* | 12/2006 | Murphy et al. | 709/206 |
| 2007/0016641 A1* | 1/2007 | Broomhall | 709/206 |
| 2007/0041372 A1 | 2/2007 | Rao | |
| 2008/0194241 A1 | 8/2008 | Kretz | |

FOREIGN PATENT DOCUMENTS

| | | |
|---|---|---|
| WO | 2004088455 | 10/2004 |
| WO | 2007022062 | 2/2007 |

OTHER PUBLICATIONS

Ram Dantu and Prakash Kolan, "Detecting Spam in VoIP Networks", Jul. 2005, USENIX, "SRUTI '05: Steps to Reducing Unwanted Traffic on the Internet Workshop", pp. 31-37.*

(Continued)

*Primary Examiner* — Hosuk Song
*Assistant Examiner* — Chi Nguy
(74) *Attorney, Agent, or Firm* — Stolowitz Ford Cowger LLP (57) ABSTRACT

A method, system and device for deterring spam on a communication medium are disclosed. The method includes detecting a call with a device for accessing the communication medium, wherein calls thereon include Internet Protocol traffic. The device includes an interface for allowing a user of to flag the call as a spam call (e.g., SPIT, SPIM, etc). Upon the flag, a signaling message associated with the call is accessed. The signaling message is stored as information relating to spam call sources. Upon detecting a subsequent call, a signaling message associated with the subsequent call is compared with the information relating to spam call sources. Upon a match between the signaling message associated with the subsequent call and the information relating to spam call sources, the subsequent call is blocked.

20 Claims, 6 Drawing Sheets

OTHER PUBLICATIONS

Dantu et al; "Detecting Spam in VoIP networks" SRUTI: Steps to Reducing Unwanted Traffic on the Internet Workshop, Jul. 7, 2005, pp. 31-37, XP002405070.

Srivastava K et al: "Preventing Spam for SIP-based Instant Messages and Sessions" Internet Citation, [Online] Oct. 28, 2004, XP002381421; Retrieved from the Internet: URL: http://www.cs.columbia.edu/techreports/cucs-042.pdf.

Macintosh R et al: "Detection and mitigation of spam in IP telephony networks using signaling protocol analysis" Advances in Wired and Wireless Communication, 2005 IEEE/Sarnoff Symposium in Princeton, New Jersey, USA Apr. 18-19, 2005 Piscataway, NJ, USA, IEEE, Apr. 18, 2005, pp. 49-52, XP010793744 ISBN:0-7803-8854-2.

Rosenberg C Jennings Cisco J Peterson Nuestar J: "The Session Initiation Protocol (SIP) and Spam" IETF Standard-Working-Draft, Internet Engineering Task Force, IETF, CH, vol. sipping, No. 1, Jul. 17, 2005, XP015040689 ISSN: 0000-0004.

European Patent Office; PCT/US2006/031593, filed Aug. 14, 2008; International Search Report; 4 pages.

Stolowitz Ford Cowger LLP, Listing of Related Cases; Nov. 11, 2009.

* cited by examiner

Fig. 6

METHOD AND SYSTEM DEVICE FOR DETERRING SPAM OVER INTERNET PROTOCOL TELEPHONY AND SPAM INSTANT MESSAGING

TECHNICAL FIELD

The present invention relates generally to the field of internetworking. More particularly, embodiments of the present invention relate to a method and system for deterring spam over Internet Protocol telephony and spam Instant Messaging™.

BACKGROUND

Modern internetworking and related technologies allow beneficial communication, file sharing and other useful applications. Electronic mail (email) comprises one such application, and one that developed relatively early and has become very popular, well established, and practical. As such, email today is, in some respects, a relatively mature medium with respect to technology, expediency, and scale, e.g., rather widespread familiarity, use, etc.

Somewhat more recently developed and implemented applications include Internet Protocol (IP) telephony and Instant Messaging™ (IM™). Both applications are now popular and fast growing. IP telephony allows the transmission of telephonic communication including voice calls, video conferencing and other real time communication over networks, channels, media, etc. in which data is exchanged using Transmission Control Protocol/Internet Protocol (TCP/IP) and Universal Datagram Protocol (UDP), etc.

IM allows computer conferencing between two or more parties via the Internet. As its name implies, IM allows an on-line user to be notified upon another person, listed with the user's computer, coming on-line, such as for establishing effectively immediate dialog therewith. Messages, which are typically text based, can be sent between the internetworked computers, effectively linking their users in real time.

IP telephony typically includes Voice over IP (VoIP) transmission on wide area networks (WAN), private intranetworks, etc. and Internet telephony on the Internet and the Internet backbone of telephone carriers (although the terms are sometimes used interchangeably). IP based telephony (e.g. packet switched) provides users with several advantages over conventional, non-IP based telephony (e.g. circuit switched). The advantages of IP based telephony typically relate to feature availability and economics.

These advantages include newer features available with IP based telephones and networks, which non-IP based telephones and the "plain old telephone system" (POTS) are simply not able to provide. Other advantages relate to cost savings, for instance on calls to distant locales. In some cases and/or for some users, the benefits of IP telephony are so significant that the medium is effectively displacing, supplanting, replacing, etc. traditional telephony.

IP telephony is thus becoming a popular, well established and practical application, in some ways much as email has. And in some ways, the popularity of IP telephony promotes the use of IM, which has also become a popular medium in its own right. For instance, in some modern business practices, IM can become a catalyst for direct voice communication using IP telephony, such as where IM is used to determine whether a party is available by IP telephone.

The advantages of IM and IP telephony, such as the relatively low cost to place a VoIP telephone call, are contributing to the popularity and usefulness of the media. IM and IP telephony have typically been operated in relatively closed network environments, e.g., networks with restricted use, availability, etc. and/or with call sources well defined and identifiable, which has so far effectively deterred the rise of mischief and misuse of the media.

However, as IP telephony and IM become more popular and the advantages inherent in the media are to be more fully realized, these applications are increasingly being used in more open network environments. Unfortunately, this opening can lead to a rise in misuse of these media. Thus, as IM and IP telephony are increasingly used in open network environments, users may receive more unsolicited and typically unwanted calls and messages.

Like the "spam" e.g., unsolicited emails, which vex and annoy many email users, unsolicited, typically unwanted and possibly annoying calls and messages may vex and annoy IM and IP telephony users. Such unsolicited calls on IP telephone media are referred to as "SPam over IP Telephony" (SPIT). Unsolicited IM™ messages are referred to as "SPam Instant Messaging" (SPIM). The email spam problem is well understood and may relate to SPIT and SPIM.

The practicality and availability of email, along with aspects related to its scale, and/or maturity combine to help make email a low cost medium. For instance, costs associated with sending an email message are effectively negligible with respect to other economic considerations relating to networking and associated communication and computing technologies. In some respects, the effectively negligible cost of email messaging is extraordinarily beneficial.

Email for instance thus provides a virtually cost-free medium for contacting other people. In fact, the low cost of sending email can be extended to achieve even greater economic benefit by sending a particular email message to more then one recipient. The email message can be sent, for instance to large numbers of recipients, effectively simultaneously. Groups of virtually any size can effectively be sent the same email message at the same time.

However, this mass-transmission capability of email, coupled with its very low cost per message, cost per recipient, etc. and related economies of scale are associated with misuse of email as a medium. For instance, unscrupulous advertisers commonly exploit email's advantages to send unwanted, unsolicited, and typically annoying messages en masse via the medium. Such troublesome email messages comprise spam and significant effort is made to deter them.

IP telephony and IM now enjoy many of the economic and other benefits associated with email. As IP telephony and IM are increasingly used over more open networks, it is not surprising that SPIT and SPIM are respectively becoming significant problems for IT telephony and IM users. The costs associated with SPIT and SPIM, like those associated with spam, are significant in terms of annoyance and vexation, lost productivity and useful information that is lost.

Information can be lost due to SPIT/SPIM for instance where calls and/or messages are obscured, obfuscated, or obliterated with SPIT/SPIM and/or in an effort to remove SPIT/SPIM from a user's phone, computer, etc. For instance, where a voicemail box associated with a user's IP telephone fills to capacity with SPIT, a "good," e.g., "real," "wanted," etc. call may be missed. Further, the user may still have to act to delete the SPIT before "good" calls can be received.

DETAILED DESCRIPTION

A device for deterring spam on a communication medium is described herein. Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims.

Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Exemplary embodiments of devices for deterring spam on a communication medium are described herein. Call traffic on the communication medium includes IP telephone calls, IM™ messages and other IP calls. In one embodiment, a call is detected with a device for accessing the communication medium. The device includes an interface for allowing a user of to flag the call as a spam call (e.g., SPIT, SPIM, etc). Upon the flag, a signaling message associated with the call is accessed. The signaling message is stored as information relating to spam call sources. Upon detecting a subsequent call, a signaling message associated with the subsequent call is compared with the information relating to spam call sources. Upon a match between the signaling message associated with the subsequent call and the information relating to spam call sources, the subsequent call is blocked.

Therefore, SPam calls over Internet Telephony (SPIT) and SPam Instant Messaging (SPIM) are deterred, which reduces costs associated with SPIT and SPIM. Annoyance and vexation, lost productivity and useful information that can be lost due to such spam calls is ameliorated. Further, user access to the communication medium is unobstructed by spam calls and related deleting actions.

Exemplary Method

Figure 1:
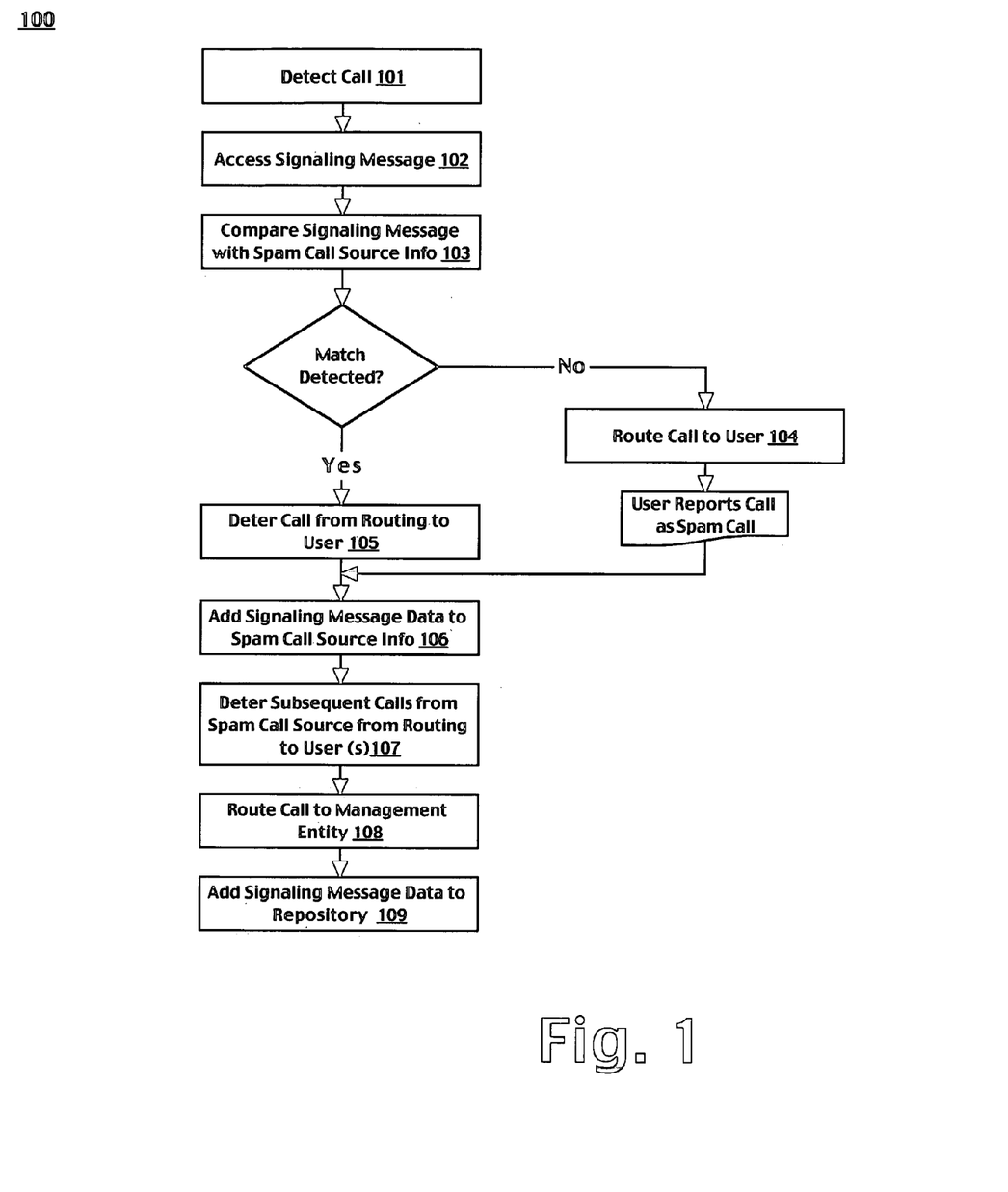
FIG. 1 is a flowchart depicting an exemplary computer implemented process for deterring spam on a communication medium, according to an embodiment of the present invention

FIG. 1 is a flowchart depicting an exemplary computer implemented process 100 for deterring spam on a communication medium, according to an embodiment of the present invention. Call traffic over the communication medium comprises information that substantially conforms with the Internet Protocol (IP). Process 100 begins with step 101, wherein a call is detected with a device (e.g., an IP telephone, a computer, etc.) for accessing the communication medium.

In step 102, a signaling message associated with the call is accessed. In one embodiment, a call control server that routes calls over the communication medium accesses the signaling message. In step 103, the signaling message is compared with spam call originator identity information, e.g., information that relates to caller identities corresponding to originators of spam calls that have been sent over the communication medium.

Such spam call originator caller identities include those reported by users of the communication medium. As used herein, the phrase "spam call" refers to SPam over Internet Telephony (SPIT) calls and SPam Instant Messaging™ (SPIM) messages. The spam call originator identity information is stored in an information repository associated with said communication medium and accessible to the call control server.

Where no match is detected between the call's signaling message and the spam call originator identity information, in step 104 the call is routed to the user. Where the signaling message is found to match any of the spam call originator identity information, in step 105 routing of the call to the user device is deterred. The call is thus blocked to the user device. In optional step 108, the deterred spam call is routed to a management, security, administrative or other entity associated with the communication medium, e.g., for processing, evaluation, assessment of a sanction, etc. In one embodiment, the management or other entity is associated with a private branch exchange, a sub-network, or a portion of the communication medium.

In step 106, the signaling message is added to the spam call originator identity information. In step 107, any other (e.g., subsequent) calls from the spam call's source (e.g., the spam call originator, a call source associated with the spam call, a call source with matching, comparable, analogous, etc. signaling message data, etc.) are deterred from being routed to the user and/or other users of the communication medium.

Where, upon routing the call (step 104) the user reports the call as SPIT, SPIM, etc., such as with an input to the call control server, the spam call originator identity information repository, etc., in step 109 data from the signaling message is added to the repository. Thus, the spam call originator identity information repository is dynamically updatable to identify new spam call sources.

Further, where the user's input corresponds to previously stored information, that information is dynamically corroborated by the input. Thus, the repository includes information relating to a reputation of spam call sources, which can be beneficial to administration and security, etc. of the communication medium.

In one embodiment, process 100 is performed by a computer system under the control of instructions encoded in (e.g., on, etc.) a computer readable medium. Process 100 can be executed with hardware, software, firmware and/or combinations thereof, and in another sequence from that described herein.

Figure 2:
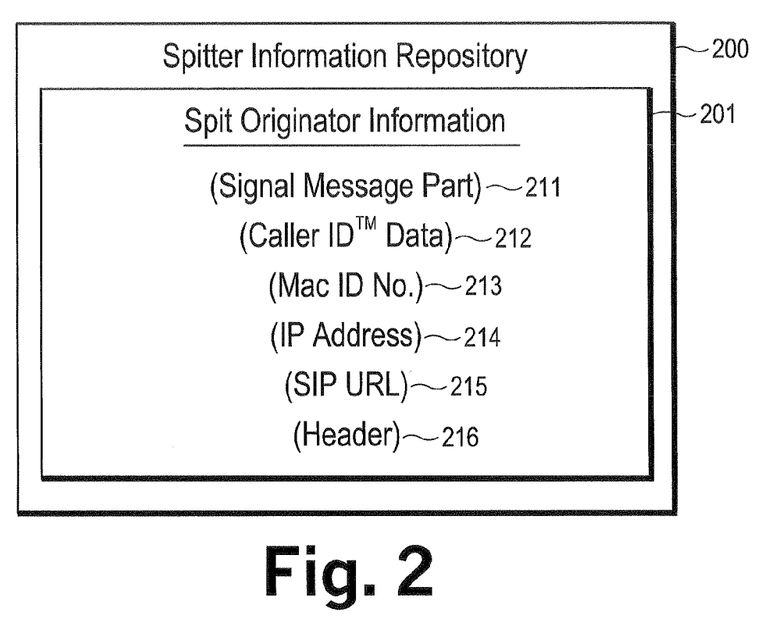
FIG. 2 depicts an exemplary repository of information related to spam call originator identities, according to one embodiment of the present invention.

FIG. 2 depicts an exemplary repository 200 of information related to spam call originator (e.g., spitter, spimmer) identities, according to one embodiment of the present invention. Repository 200 stores information 201, which is related to spam call originator identity information. Spam call originator identity information comprises one or more of a part 211 of a signaling message associated with a spam call made over the communication medium, identification data 212 related to Caller ID™ associated with a spam call, a media access control (MAC) identity number 213 associated with a spam call, an IP address 214 associated with a spam call, a Session Initiation Protocol (SIP) Uniform Resource Locator (URL) 215 associated with a spam call or a header (e.g. a Via header) 216 associated with a spam call. In one embodiment, repository 200 is associated with a service provider, an entity that operates, manages, administers, etc. a communication medium. In one embodiment, repository 200 is remote from a user device. In another embodiment, repository 200 is local to a user device, deployed for instance as a component thereof, readable therewith, etc.

Exemplary System

Figure 3:
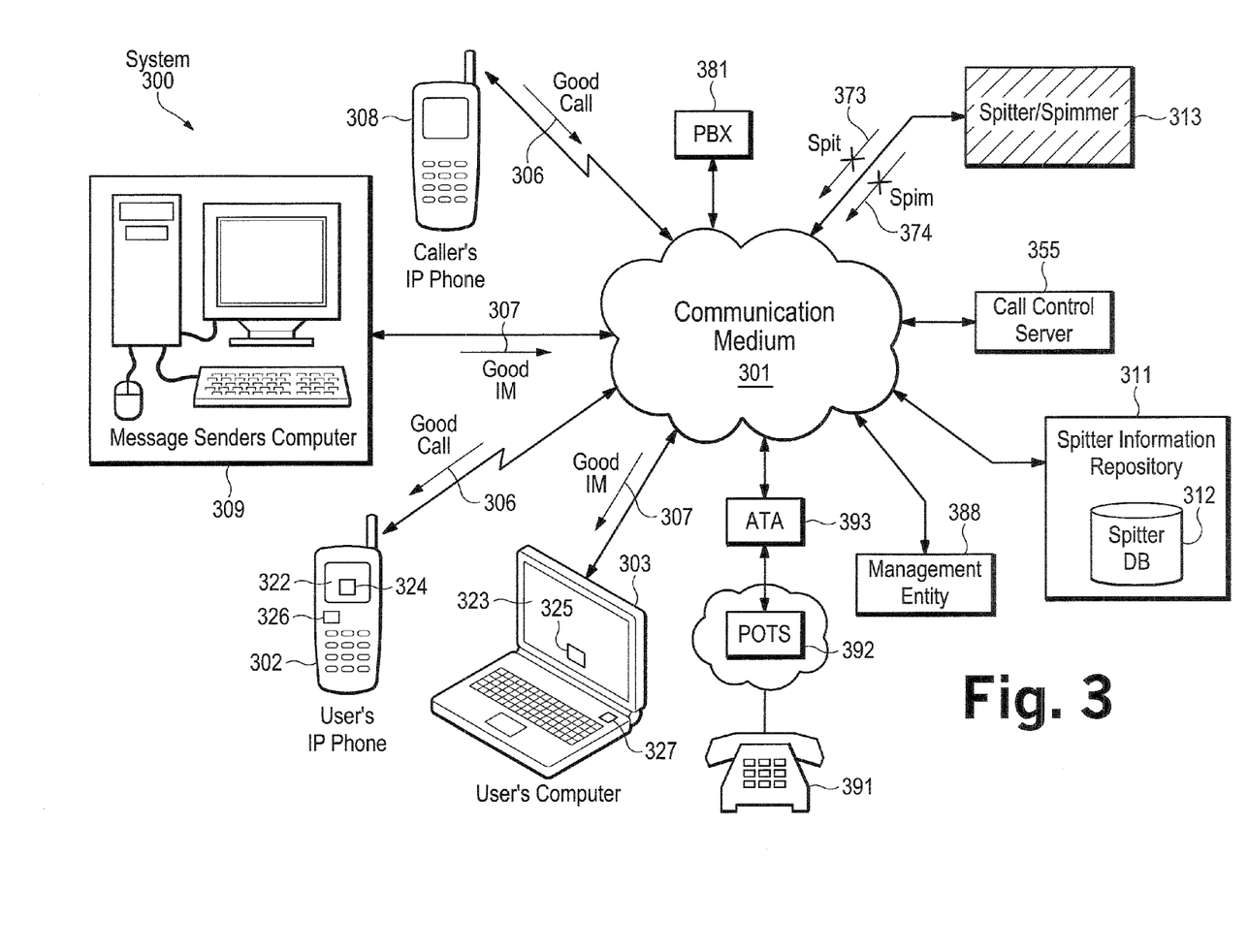
FIG. 3 depicts an exemplary system for deterring spam on a communication medium, according to an embodiment of the present invention.

FIG. 3 depicts an exemplary system 300 for deterring spam on a communication medium 301, according to an embodiment of the present invention. Communication medium 301 can be the Internet or another communication network. Call traffic on communication medium 301 includes IP telephone calls and IM™ messages.

For instance, a user can receive IP telephone calls 306 via communication medium 301 on an IP telephone device 302 from a caller's IP telephone 308. Similarly, the user can receive IM™ messages 307 via communication medium 301 from a message sender's computer 309. IP calls over communication medium 301 are controlled by call control server 355, which respectively routes calls 306 and IM™ messages 307 via communication medium 301 from caller's devices 308 and 309 to the user's devices 302 and 303.

Further, applications such as a web browser running on the user's IP phone 302, computer 303, etc. allow the user to access components of system 300. Thus, users can make inputs thereto. For example, soft key features 324 and 325, implemented with a graphical user interface (GUI), can be used. Users can also use hardware based interfaces such as dedicated, designated, etc. buttons 326 and 327.

Call control server 355 is communicatively coupled to information repository 311, e.g., via communication medium 301. Information repository 311 stores information relating to identities that correspond to originators of spam calls sent over communication medium 301.

For instance, users of communication medium 301 can, upon receiving a spam call, report the call as spam using a user interface in IP phone 302 and/or computer 303 such as soft keys 324 and 325, keys 326 and 327, voice commands, key stroke sequences, etc. In one embodiment, users can also report spam calls with an analog telephone 391, which can access communication medium 301 from a plain old telephone system (POTS) 392 via analog telephone adapter (ATA) 393. Analog users can use keystroke sequences, voice commands, etc. as well.

In one embodiment, any of phones 302 and 308, computers 309 and 323, repository 311, call control server 355 and management entity 388 can be served by and/or comprise elements of a private branch exchange 381, a local call manager, etc.

Repository 311 is thus dynamically updatable and information stored therein corroborated over time to effectively include spam call source reputation information. In one embodiment, repository 311 has a dynamically updatable database 312.

The user interface can include a hardware based spam reporting feature such as a dedicated button or key on IP phone 302 or computer 303. The user interface can also include a software or firmware based reporting feature, such as a soft spam call reporting key feature of a graphical user interface (GUI) associated with IP telephone 302 and/or computer 303, a voice activated interface, etc.

Upon sensing a call directed to the user on communication medium 301, call control server 355 accesses repository 311 and compares the signaling message included with the call with the spam call originator identity information stored therein.

Where no match is detected between the signaling message of the user's incoming call and any spam call originator identity information stored in repository 311, the call is routed to the user. Thus, IP telephone call 306 and IM™ message 307 are respectively routed from the caller's IP telephone 308 and computer 309 to the user's IP telephone 302 and computer 303.

Calls originating with call sources that have reputations for sending spam calls such as SPIT and/or SPIM (e.g., that have been previously reported by users) may have data within their signaling messages that matches information stored in spam call originator identity information repository 311. For instance, data within a call's signaling message may match part of a stored signaling message part, a header (e.g., a Via header), a stored uniform resource locator associated with session initiation protocol; a stored MAC address, a stored IP address, and/or stored data relating to a Caller ID™ identity, etc.

Upon a call's signaling message matching any such spam call originator identity information stored in repository 311, call control server deters routing that call to the user IP telephone 302 and/or computer 303. Thus, call control server 355 blocks SPIT call 373 from being routed from SPIT/SPIM sender 313 via communication medium 301 to the user's IP telephone 302 and blocks SPIM message 374 from being routed from SPIT/SPIM sender 313 via communication medium 301 to the user's computer 303.

In one embodiment, SPIT call 373 and/or SPIM message 374 are delivered to a management, administration, security, etc. entity 388 associated with the communication medium 301 for evaluation, such as for sanctions, billing, etc. Further, subsequent call from spam call source to the user (and e.g., other users) can be deterred. In one embodiment, one or more components associated with system 300 comprise means for executing one or more portions of process 100, described above.

Figure 4:
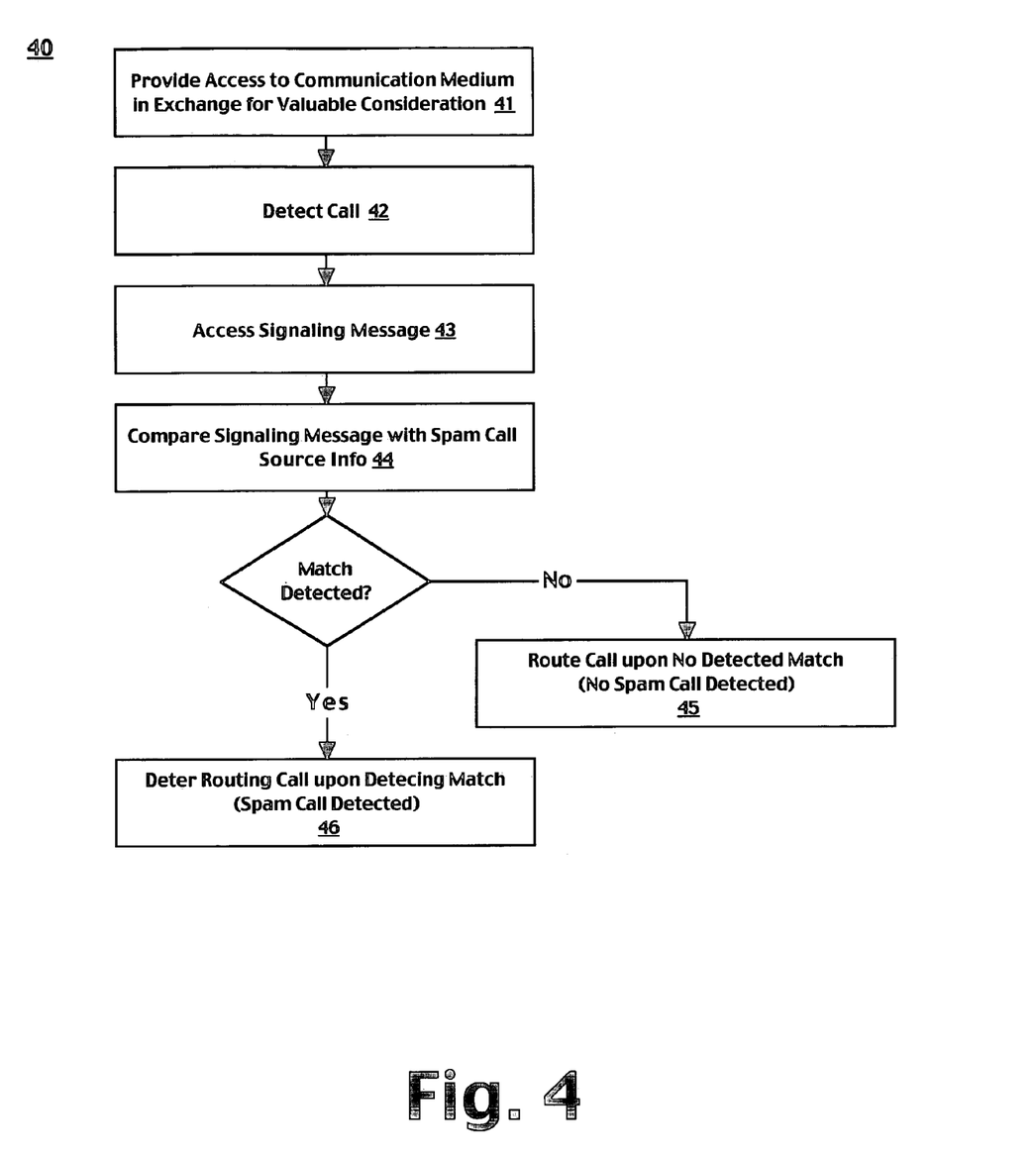
FIG. 4 is a flowchart of an exemplary method for managing a communication medium wherein spam transmission thereon is deterred, according to an embodiment of the present invention.

FIG. 4 is a flowchart of an exemplary method 40 for managing a communication medium wherein spam transmission thereon is deterred, according to an embodiment of the present invention. Call traffic on the communication medium includes IP traffic such as IP telephone calls and/or IM™ messages. Process 40 begins with step 41, wherein a user (e.g., customer) is provided with access to a communication medium in exchange for valuable consideration, such as a fee for access, communication services, etc., subscription, etc.

In step 42, a call to the user on the communication medium is detected. In step 43, a signaling message associated with the call is accessed. In step 44, the signaling message is compared with information relating to identities corresponding to originators of spam calls sent over the communication medium that is stored in a repository associated therewith.

Upon finding no match between the signaling message and the spam call originator identity information, in step 45, the call is routed to the user device. In step 46, where it is determined that the signaling message matches any stored spam call originator identity information, routing of that call to the user is deterred. Users of the communication medium that receive a spam call can report the call as spam, thus dynamically updating, corroborating, etc. the stored spam call source information. Users thus benefit from deterrence of spam calls and from dynamically updated spam call originator identity storage, etc.

Figure 5:
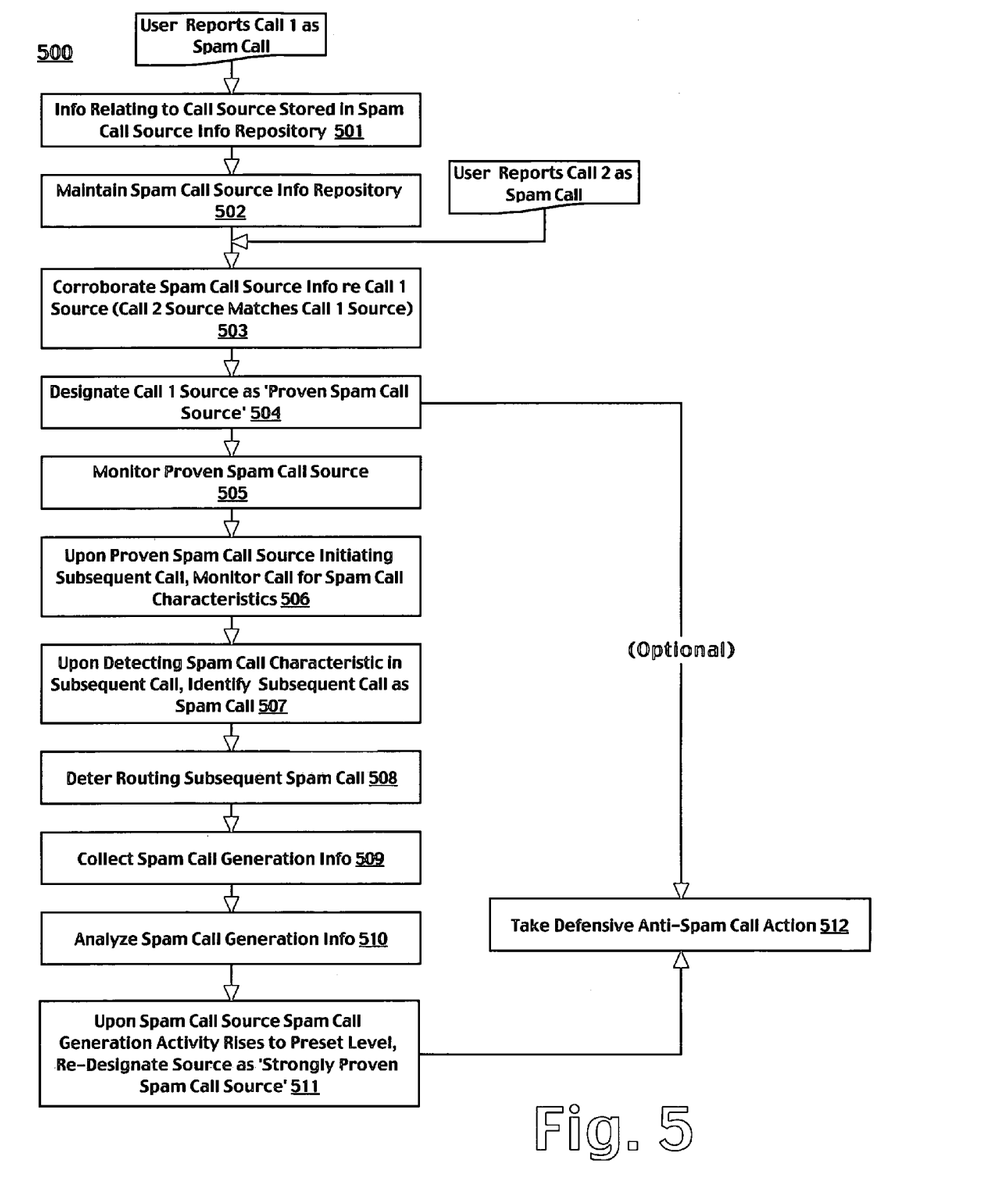
FIG. 5 is a flowchart of an exemplary computer implemented process for designating a reputation related to a call source on a communication medium, according to an embodiment of the resent invention.

FIG. 5 is a flowchart of an exemplary computer implemented process 500 for designating a reputation related to a call source on a communication medium, according to an embodiment of the present invention. Process 500 begins with step 501, wherein upon a user of the communication medium reporting a first call as a spam call, information relating to a source of that first call is stored in a spam caller identity information repository.

In step 502, the spam caller identity information repository is maintained. Maintenance of the spam caller identity information repository includes, upon a user (e.g., the same user, another user, etc.) of the communication medium reporting a subsequent call as a spam call and information relating to a source of the subsequent spam call matching information corresponding to said first call, corroborating said information corresponding to said first call in step 503. Based on this corroboration, in step 504, the call source is designated as a proven (e.g., verified, confirmed, tested, "repeat offender," etc.) spam call source.

In step 505, the designated spam call source is monitored. Upon the designated spam call source initiating a second subsequent call, in step 506 the second subsequent call is monitored for a characteristic related to spam calls. For instance, some spam calls are characterized by mass broadcast thereof from a single call source to multiple callees, whose call destinations may or may not be significantly related. Upon detecting such a spam call characteristic, in step 507 the second subsequent call is identified as a spam call. In step 508, routing of the second subsequent call from the designated spam source to a callee is deterred.

In step 509, spam call generation information such as subsequent designations relating to the proven spam call source, spam call generation observation while that source is monitored, etc. are collected. In step 510, spam call generation information is analyzed. Where the spam call source generation information is observed to rise to a selectable, presetable, etc. level, in step 511 the source is re-designated as a strongly proven (e.g., strongly verified, confirmed, tested, "egregious repeat offender," etc.) spam call source. In step 512, defensive action to protect the communication medium from the spam call generation activity, network, etc. can be taken by an entity that operates, manages, administers, the communication medium. In one embodiment, step 512 can be taken after step 504, e.g., upon designating a proven spam call source.

Figure 6:
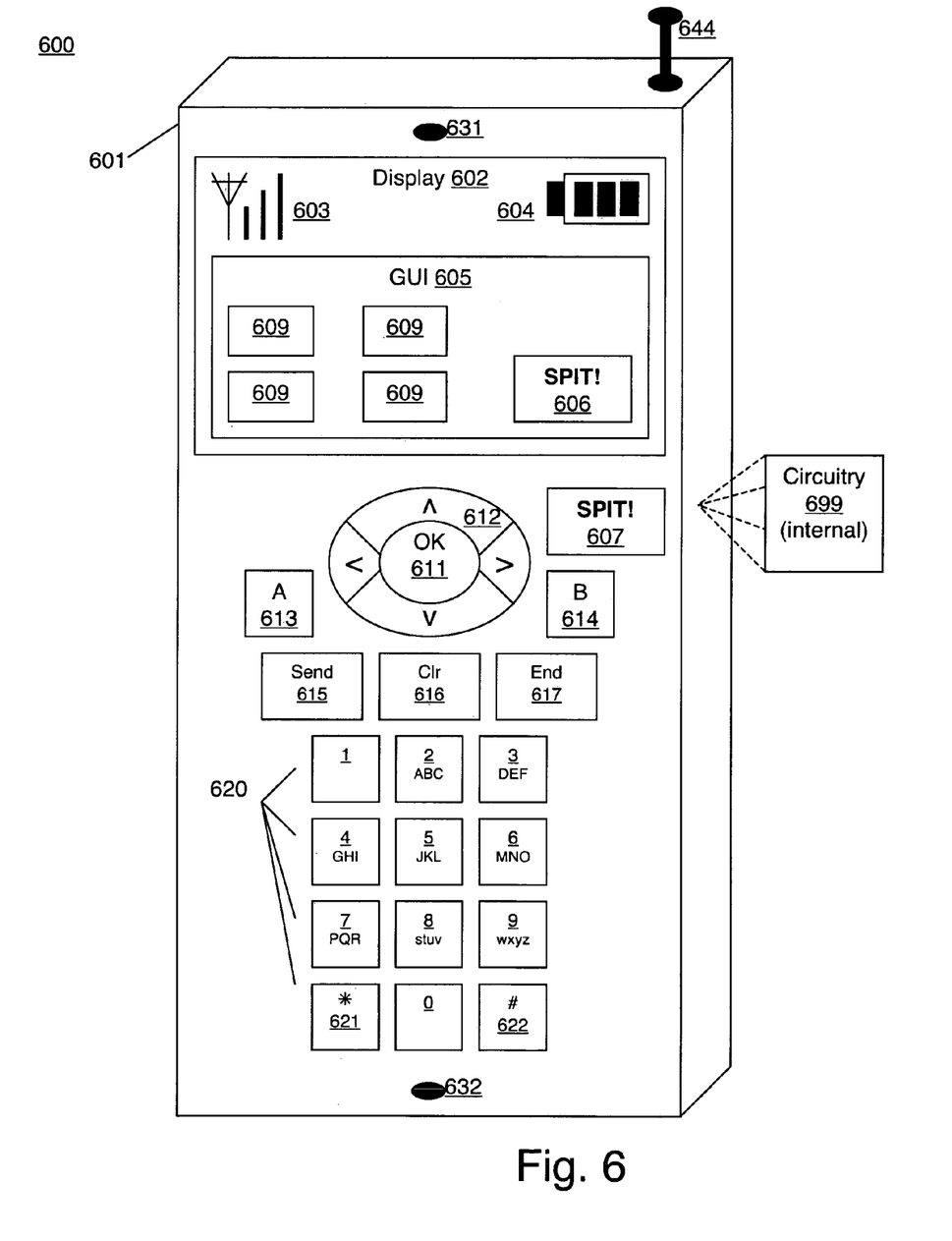
FIG. 6 depicts an exemplary communicating device for deterring spam calls, according to an embodiment of the resent invention.

FIG. 6 depicts an exemplary communicating and/or computing device 600 for blocking spam calls, according to an embodiment of the resent invention. Device 600 comprises a communicating and/or computing (hereinafter "communicating") system capable of communicatively coupling with a communication network, medium, etc. (e.g., communication medium 301; FIG. 3), for instance wirelessly, and performing functions related to internet telephony (IT), Instant Messaging™ (IM™), etc.

Exemplary Communicating Device

FIG. 6 depicts communicating device 600 in an exemplary digital cellular telephone (cellphone) implementation. It should be appreciated that communicating device 600 can comprise a variety of implementations. For example, device 600 can comprise another cellular, digital, etc. telephone, a portable computer such as a hand-held (e.g., palm top), laptop, personal digital assistant (PDA), etc., other computers and telephones, etc. and other devices, apparatus, appliances, etc. In one implementation, communicating device 600 comprises an ATA.

Thus, communicating device 600 can comprise one or more of an IP telephone, a cellular telephone, a legacy telephone, a desktop telephone, a telephone or other device substantially compliant with the wireless fidelity (WiFi™) standards promulgated by the Institute for Electrical and Electronics Engineering (IEEE) in its Standard 802.11 (e.g., a WiFi™ telephone), a dual mode telephone, an analog telephone coupled to the communication medium with an analog telephone adapter and a computer.

Exemplary cellphone device 600 comprises a sturdy case 601, e.g., of a tough plastic or comparably suitable composition. Case 601 provides structural integrity for other components of device 600. Functionality of device 600 is provided with circuitry 699, which is internal to case 601 and ensconced (e.g., isolated, protected, etc.) therewith from the environment in which the device is deployed, used, etc., from contamination, from user contact, etc.

Circuitry 699 includes components such as processors, memory, signal processing, transceiving, modulating and demodulating, multiplexing and demultiplexing, control, amplifying, power management, discrete, IC and other components, which can be coupled with a bus and other conductors, signal, data, etc. flow paths, power devices such as a battery, and other components. Some of these hardware type components, such as a processor with memory, etc., function in some implementations with programmed software, configured firmware, etc. Thus, In one embodiment, device 600 functions as a computer system under the control of computer readable code stored in a computer readable medium, for instance, stored thereon (e.g., therein, etc.). Components of circuit 699 and their effective interrelations are well known in the communicating, computing and related arts. In one embodiment, circuit 699 comprises means for allowing a user to deter spam calls.

Circuitry 699 functions to allow device 600 to wirelessly communicate using an antenna 644. Users can provide sonic input to circuitry 699 with a microphonic component 632. Circuitry 699 functions to provide telephonic sound to a user of device 600 with a speaker component 631. Circuitry 699 functions to allow device 600 to provide graphical information with a display component 602.

Display unit 602 can, in various implementations, provide a variety of graphical information including for example text, graphics, icons, etc. Exemplary icons 603 and 604 respectively indicate wireless communication signal strength and battery charge condition.

A user can, in various implementations, interface with circuitry 699 to operate device 600 using one or more of several modalities. Hardware based keys comprise one such modality. For instance, familiar telephonic operations can be conducted (performed, etc.) using keys 1-0 (e.g., keys 620), which can also be used to input textual (e.g., alphanumeric, etc.) information, and keys 621 (*) and 623 (#). Familiar cellphone and other telephonic operations can be conducted with keys 615-617. Several stored menus are accessible with keys 613 and 614, for instance to be displayed to the user on display unit 602.

Software based interface modalities for user interfacing with circuitry 699 comprise, in various implementations, voice activated interfacing and/or a graphical user interface (GUI). The GUI field 605 displays an interactable soft key 609, which a user can scroll to and select to provide an input to circuitry 699, for instance to control device 600 to perform an operation, etc. Scrolling and selection can be accomplished with keys 612 and 611 respectively, and/or with various possible key stroke operations, sequences, etc. of other keys. For instance, a user can scroll amongst information displayed on display unit 602 and make selection therefrom with soft key 609 and/or with hardware keys 612 and 611, respectively. Soft key 609 use allows scrolling between selectable operations, entries, etc., e.g., using hardware keys 612 and 611.

Upon receiving an incoming call, a user can answer the call with a key based or other action. A user may also decline to answer a call. For instance, an identifier related to a source of an incoming call is displayable on display unit 602. Where the user recognizes the call source as relating to a caller with whom they would rather not speak or where the user does not recognize the call source, the user can simply decline to take action to answer the call, which can then be routed to voice mail, terminated, etc.

A user of device 600, upon receiving a call and determining that it is a spam call (SPIT, SPIM, etc.), can take an action to identify the call as a spam call. In one embodiment, a user interfaces with circuitry 699 to identify the call as a spam call. Such action can comprise several forms. In one implementation, a hardware based key 607 provides a direct or routed input to circuitry 699 to report the call as a spam call. Circuitry 699 responsively blocks further calls from the source of the spam call.

For instance, circuitry 699 can database or otherwise store routing information, headers, Caller ID™ based information, metadata, packet identifiers, and/or other signaling information associated with the source of the spam call. Upon receipt of subsequent calls, circuitry 699 compares the signaling information associated therewith to the stored information relating to the previously identified spam call. Where circuitry 699 detects a match between the stored spam call signaling information and the signaling information associated with the incoming call, circuitry 699 acts to block the call.

Further, circuitry 699 can take further action, reporting the incoming call, as well as the previously identified spam call, to a management, spam control, security, administrative, or similar entity involved in the operation of the medium with which communicating device 600 communicates and/or with a private branch exchange. In this way, the signaling information stored in communicating device 600 and used by circuitry 699 therein can add to spam call source related "intelligence" gathered from other users as well. Nonetheless, communicating device 600 has inherent flexibility, which allows its users to express their own spam call blocking and other call blocking preferences.

In one implementation, an interactive software based key 606, provided with GUI 605, allows the user to report the call as a spam call. Circuitry 699 responsively blocks further calls from the source of the spam call. In one implementation, users can interact with circuitry 699 using selected sequences of other keys such as keys 620, 621, 622, etc. to report the call as a spam call. In one implementation, users can interact with circuitry 699 using a voice activated interface to report the call as a spam call, for instance with audible prompts heard with speaker 631 and vocal or other sonic responses made with microphone 632. In each of these other implementations, circuitry 699 responsively blocks further calls from the source of the spam call. In yet another implementation, users can block calls and identify spam call sources to be blocked using a web interface to device 600.

Where device 600 comprises an ATA, a user receiving an unwanted or spam call on a connected analog telephone, the user hangs up, terminating the call, and immediately or after not more than a brief delay picks up and dials a predetermined set of digits with the keys 620, 621, 622, etc. The ATA 600 senses the key code and adds the last caller (or latest several calls, depending upon the processing, memory and other capabilities of device 600) such as a spam call source to the blocked list associated with the storage capability of circuitry 699. Upon a subsequent call attempt to the analog telephone connected to ATA 600, the call is blocked therewith: the call is not accepted and the telephone will not ring or otherwise signal an incoming call.

In one embodiment, a list of blocked call sources is stored locally, but not on (e.g., in) the device. For instance, the list can be stored locally in a related private branch exchange (PBX), a call manager, e.g., on a local personal or other computer, etc. In another embodiment, the list of blocked caller sources is stored in a location accessible with the network and can be changed, updated, edited, etc. (e.g., manually, etc.) via a web interface, GUI 605, etc. In yet another embodiment, a part of the blocked call sources list is storable locally on device 600. In these various embodiments, blocked call sources lists generated with device 600 can be shared with the network, which has the advantage of networking individually acquired and/or accumulated "intelligence" relating to SPAM call sources.

Embodiments of the present invention, an apparatus and system for deterring spam over Internet Protocol telephony and spam Instant Messaging,™ are thus described. While the present invention has been described in particular exemplary embodiments, the present invention is not to be construed as limited by such embodiments, but rather construed according to the claims below.

What is claimed is:

1. A method comprising:
receiving, from one or more receiving devices, multiple user reports that identify call connections established between a call source and the one or more receiving devices as spam calls, wherein the multiple user reports are based on a perception by at least one user of the one or more receiving devices that the call connections established between the call source and the one or more receiving devices are spam calls, and wherein information corresponding to the call source is stored in a storage repository responsive to receiving a first one of the multiple user reports;
after receiving the multiple user reports that the call source established multiple spam calls, updating the information corresponding to the call source in the storage repository to designate the call source as a repeat spam call offender;
initiating, with a call control center, monitoring of any future call connections the call source designated as the repeat spam call offender attempts to establish in response to updating the information corresponding to the call source in the storage repository to designate the call source as the repeat spam call offender; and
re-updating the information corresponding to the call source in the storage repository to re-designate the repeat spam call offender as a confirmed repeat spam call offender after the call source designated as the repeat spam call offender has been monitored attempting to establish at least one future call connection having at least one spam call characteristic, and wherein the re-designation of the call source as the confirmed repeat spam call offender indicates that one or more new call connections initiated by the call source are to be blocked for all receiving devices.

2. The method as recited in claim 1, wherein the storage repository is located in at least one of the receiving devices, and further comprising:
accessing a list of one or more call sources stored in the storage repository;
comparing a signaling message associated with the at least one future call connection with the list of one or more call sources in the storage repository; and blocking the at least one future call connection when the signaling message matches a call source designated as a confirmed repeat spam call offender in the list.

3. The method as recited in claim 1, further comprising routing the blocked new call connection to a management device of a communication medium for assessment of a sanction against the call source.

4. The method as recited in claim 1, further comprising:
determining the call source designated as the repeat spam call offender is attempting to initiate a mass broadcast to multiple receiving devices based on the monitoring; and
updating the storage repository to re-designate the call source as the confirmed repeat spam call offender when the call source is currently designated as the repeat spam call offender and based on the determined attempt to initiate the mass broadcast to multiple receiving devices.

5. The method as recited in claim 1, further comprising:
determining the call source designated as the repeat spam call offender is attempting to initiate a mass broadcast to unrelated destinations based on the monitoring; and
updating the storage repository to re-designate the call source as the confirmed repeat spam call offender when the call source is currently designated as the repeat spam call offender and based on the determined attempt to initiate the mass broadcast.

6. A system comprising:
means for establishing multiple call connections between a network communication device and one or more receiving devices;
means for receiving, from the one or more receiving devices, multiple indications that identify the call connections from the network communication device as spam calls, wherein the multiple indications are based on a perception by at least one user of the one or more receiving devices that the call connections established between the call source and the one or more receiving devices are spam calls, and wherein information identifying the network communication device is stored in a storage repository responsive to receiving a first one of the multiple indications;
means for updating the information identifying a call source in the storage repository to designate the network communication device as a repeat spam call offender after receiving the multiple indications that the call source established multiple spam calls; and
means for monitoring any future call connections the network communication device attempts to establish, wherein the means for monitoring is configured to initiate monitoring of the future call connections in response to the designation of the network communication device as the repeat spam call offender in the storage repository, wherein the means for updating is configured to re-update the information identifying the call source in the storage repository to re-designate the repeat spam call offender as a confirmed repeat spam call offender after the network communication device designated as the repeat spam call offender is monitored attempting to establish at least one future call connection having at least one spam call characteristic, and wherein the re-designation of the network communication device as the confirmed repeat spam call offender indicates that one or more future call connections initiated by the network communication device are to be blocked for all receiving devices.

7. The system as recited in claim 6, further comprising means for routing the blocked new call connection to a management device of a communication medium for assessment of a sanction against the network communication device.

8. The system as recited in claim 6, further comprising:
means for determining the network communication device designated as the repeat spam call offender is attempting to initiate a mass broadcast to multiple receiving devices based on the monitoring, wherein the means for updating the storage repository is configured to re-designate the network communication device as the confirmed repeat spam call offender when the network communication device is designated as the repeat spam call offender and based on the determined attempt to initiate the mass broadcast to multiple receiving devices.

9. The system as recited in claim 6, further comprising:
means for determining the network communication device designated as the repeat spam call offender is attempting to initiate a mass broadcast to unrelated destinations based on the monitoring, wherein the means for updating the storage repository is configured to re-designate the network communication device as the confirmed repeat spam call offender when the network communication device is designated as the repeat spam call offender and based on the determined attempt to initiate the mass broadcast.

10. A computer-readable memory including instructions that, when executed by a processing device, cause the processing device to:
establish multiple call connections between a network communication device and one or more receiving devices;
receive, from the one or more receiving devices, multiple indications that identify the call connections from the network communication device as spam calls, wherein the multiple indications are based on a perception by at least one user of the one or more receiving devices that the call connections established between the network communication device and the one or more receiving devices are spam calls, and wherein information corresponding to the network communication device is stored in a storage repository responsive to receiving a first one of the multiple indications;
update the information corresponding to the network communication device in the storage repository to designate the network communication device as a repeat spam call offender after receiving the multiple indications from the one or more receiving devices that the network communication device established multiple spam calls;
initiate monitoring any future call connections the network communication device designated as the repeat spam call offender attempts to establish in response to the update of the information corresponding to the network communication device in the storage repository to designate the network communication device as the repeat spam call offender; and
re-update the information corresponding to the network communication device in the storage repository to re-designate the network communication device as a confirmed repeat spam call offender after the network communication device designated as the repeat spam call offender has been monitored attempting to establish at least one future call connection with at least one spam call characteristic, and wherein the re-designation of the network communication device as the confirmed repeat spam call offender indicates that one or more future call connections initiated by the network communication device are to be blocked for all receiving devices.

11. The computer-readable memory as recited in claim 10, wherein the instructions, when executed, further cause the processing device to route the blocked new call connection to a management device of a communication medium for assessment of a sanction against the network communication device.

12. The computer-readable memory as recited in claim 10, wherein the instructions, when executed, further cause the processing device to:
determine the network communication device designated as the repeat spam call offender is attempting to initiate a mass broadcast to multiple receiving devices based on the monitoring; and
update the storage repository to re-designate the network communication device as the confirmed repeat spam call offender when the network communication device is currently designated as the repeat spam call offender and based on the determined attempt to initiate the mass broadcast to multiple receiving devices.

13. The computer-readable memory as recited in claim 10, wherein the instructions, when executed, further cause the processing device to:
determine the network communication device designated as the repeat spam call offender is attempting to initiate a mass broadcast to unrelated destinations based on the monitoring; and
update the storage repository to re-designate the network communication device as the confirmed repeat spam call offender when the network communication device is currently designated as the repeat spam call offender and based on the determined attempt to initiate the mass broadcast.

14. A method comprising:
receiving, from one or more receiving devices, multiple user reports that identify call connections over a communication medium from a network communication device as spam calls with the one or more receiving devices, wherein information corresponding to the network communication device is stored in a storage repository responsive to receiving a first one of the multiple user reports;
designating the network communication device as a repeat spam call offender in the storage repository based on the multiple user reports from the one or more receiving devices that the network communication device established multiple spam calls;
monitoring the network communication device with a call control center only when the network communication device is designated as the repeat spam call offender;
re-designating the network communication device in the storage repository from the repeat spam call offender to a confirmed repeat spam call offender after the network communication device designated as the repeat spam call offender has been monitored attempting to establish a future call connection having a spam call characteristic; and
blocking an establishment of a new call connection to any receiving device when the new call connection is initiated by the network communication device re-designated as the confirmed repeat spam call offender.

15. The method as recited in claim 14 wherein the communication medium comprises one or more of a private branch exchange and a call manager.

16. The method as recited in claim 14, wherein the storage repository is located in at least one of the receiving devices, and further comprising:
accessing a list of one or more call sources stored in the storage repository;
comparing a signaling message associated with the new call connection with the list of one or more call sources in the storage repository; and
blocking the new call connection when the signaling message matches a call source designated as a confirmed repeat spam call offender in the list.

17. The method as recited in claim 14 wherein the receiving device comprises one or more of an internet protocol telephone, a cellular telephone, a legacy telephone, a desktop telephone, a WiFi™ telephone, a dual mode telephone, or an analog telephone coupled to the communication medium with an analog telephone adapter and a computer.

18. The method as recited in claim 14, further comprising routing the blocked new call connection to a management device of the communication medium for assessment of a sanction against the network communication device.

19. The method as recited in claim 14, further comprising:
determining the network communication device designated as the repeat spam call offender is attempting to initiate a mass broadcast to multiple receiving devices based on the monitoring; and
updating the storage repository to re-designate the network communication device as the confirmed repeat spam call offender when the network communication device is currently designated as the repeat spam call offender and based on the determined attempt to initiate the mass broadcast to multiple receiving devices.

20. The method as recited in claim 14, further comprising:
determining the network communication device designated as the repeat spam call offender is attempting to initiate a mass broadcast to unrelated destinations based on the monitoring; and
updating the storage repository to re-designate the network communication device as the confirmed repeat spam call offender when the network communication device is currently designated as the repeat spam call offender and based on the determined attempt to initiate the mass broadcast.

* * * * *